United States Patent [19]
Wiman et al.

[11] Patent Number: 5,634,745
[45] Date of Patent: Jun. 3, 1997

[54] CUTTING INSERT

[75] Inventors: Jörgen Wiman; Jan Lundström, both of Sandviken, Sweden

[73] Assignee: Sandvik AB, Sandviken, Sweden

[21] Appl. No.: 698,254

[22] Filed: Aug. 14, 1996

Related U.S. Application Data

[63] Continuation of Ser. No. 444,509, May 19, 1995, abandoned.

[30] Foreign Application Priority Data

May 19, 1994 [SE] Sweden ................... 9401732

[51] Int. Cl.$^6$ ........................... B23B 27/22
[52] U.S. Cl. ........................ 407/113; 407/115; 407/114; 407/120
[58] Field of Search .................... 407/113, 114, 407/115, 42, 43, 120

[56] References Cited

U.S. PATENT DOCUMENTS

| | | | |
|---|---|---|---|
| 4,140,431 | 2/1979 | Friedline et al. | 407/114 |
| 4,248,553 | 2/1981 | Kraemer | 407/114 |
| 4,259,033 | 3/1981 | McCreery et al. | |
| 4,371,296 | 2/1983 | Bernstein et al. | |
| 4,552,492 | 11/1985 | Komanduri et al. | 407/114 |
| 4,681,488 | 7/1987 | Markusson | |
| 4,940,369 | 7/1990 | Aebi et al. | |
| 5,028,175 | 7/1991 | Pawlik | 407/114 X |
| 5,226,761 | 7/1993 | Satran et al. | |
| 5,256,009 | 10/1993 | Stoffels | 407/42 |

FOREIGN PATENT DOCUMENTS

| | | |
|---|---|---|
| 0054481 | 6/1982 | European Pat. Off. |
| 0300247 | 1/1989 | European Pat. Off. |
| 8772734 | 10/1980 | U.S.S.R. |
| 1606262 | 11/1990 | U.S.S.R. |
| 94/22622 | 10/1994 | WIPO |
| 95/00272 | 1/1995 | WIPO |

*Primary Examiner*—M. Rachuba
*Assistant Examiner*—Henry W. H. Tsai
*Attorney, Agent, or Firm*—Burns, Doane, Swecker & Mathis, L.L.P.

[57] ABSTRACT

A turning insert includes corner surfaces each defined by at least five circle segments arranged in succession between adjacent side surfaces. Successive ones of the circle segments have different radii of curvature. The segments include a center or first segment intersected by a bisector of the corner surfaces, second and third segments disposed on respective sides of the first segment, and third and fourth segments disposed adjacent respective sides of said second and third segments, respectively. The first segment defines a first radius. The second and third segments defining equal second and third radii. The fourth and fifth segments defining equal fourth and fifth angles. Each of the fourth and fifth angles is larger than the first radius. The first radius is larger than each of the second and third angles.

12 Claims, 4 Drawing Sheets

CUTTING INSERT

This application is a continuation of application Ser. No. 08/444,509, filed May 19, 1995, now abandoned.

BACKGROUND OF THE INVENTION

The present invention relates to a metal cutting insert which is primarily intended for turning operations, the insert being indexable, i.e., it has more than one operative corner cutting edge and so that when one corner has been worn out, the insert can be turned or indexed so that a new corner becomes active.

For all sorts of turning operations, there is a certain interplay between the feed rate and the corner radius, the corner radius being the connection between the main cutting edge and the secondary cutting edge. Thus, for rough machining, a largest possible corner radius should be chosen in order to obtain a strong cutting edge. On the other hand, a corner radius too large may cause vibrations. Therefore, for fine turning usually a smaller corner radius is selected, normally smaller than 2 mm. The disadvantage with a small corner radius is that it increases the wear rate of the insert, thereby deteriorating its life and performance. The surface smoothness produced on the workpiece is specifically influenced by the interplay between the corner radius and the feed rate.

The entering angle is defined as the angle between the main cutting edge and the direction of feed. This angle has a considerable influence on the interrelation between the different cutting force components, and thereby also on the surface smoothness and dimension accuracy. The angle of tool back clearance is the angle between the secondary cutting edge and the direction of feed and it affects the smoothness of the turned surface. It is evident that for a specific insert it is not possible to alter the entering angle without simultaneously changing the angle of tool back clearance. Thus, surface smoothness and dimension accuracy are very sensitive to changes of the entering angle.

A fundamental problem for all turning operations is that the desired smoothness is not achieved. Sometimes the surface smoothness can be improved by using higher cutting speeds and neutral or positive rake angles. However, the sensitivity to the adjustment of the entering angle remains.

Thus, a first object of the present invention is to improve the smoothness of the machined surface.

A second object of the present invention is to reduce the sensitivity of a turning cutting insert relative to the positioned entering angle.

SUMMARY OF THE INVENTION

These and further objects have been attained by a radius having a nose radius surface which comprises at least five circle segments arranged in succession between adjacent side surfaces of the insert such that successive circle segments have different radii of curvature.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
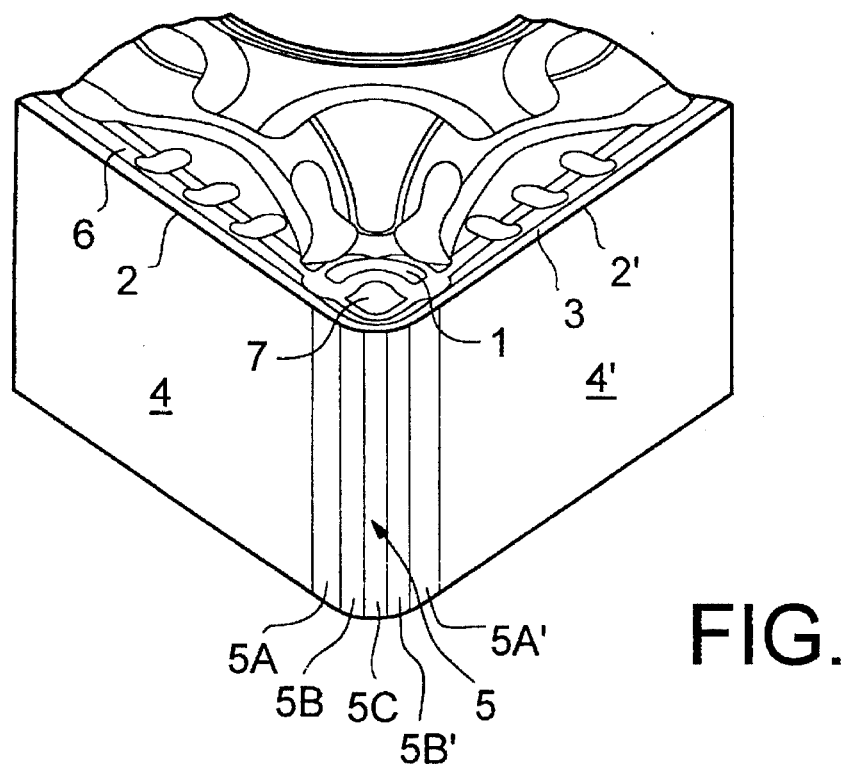
FIG. 1 shows a side view obliquely from above of a corner of a turning cutting insert according to the invention.

FIG. 1 shows a corner or nose portion of a turning cutting insert according to the present invention, which insert may be either single- or double-sided. The insert is usually made of cemented carbide but may also be made of different ceramic materials. Because of the cost of production, the insert is suitably formed by being directly pressed. According to this embodiment (FIG. 1), each operative cutting corner comprises on the upper side of the insert (and for double-sided inserts, also on the opposed side), a curved protrusion 1 according to our Swedish patent application No. 9301132-8 (WO-A-94/22622), the disclosure of which is incorporated herein by reference. In immediate connection to the cutting edges 2 and 2', and also to the corner cutting edge, a primary land 3 adjoins on the upper side of the insert, which primary land is substantially perpendicular to the side surfaces 4, 4' of the insert and to the rounded corner radius surface 5 of the insert. A rake surface 6 slopes downwardly and inwardly from the primary land 3. A curved protrusion 1 merges into and overlaps with the rake surface 6 and delimits thereby a corner surface portion 7. The cutting insert is rhombic, the corner portion shown in FIG. 1 having a corner portion 7. The cutting insert is rhombic, the corner portion shown in FIG. 1 having a total corner radius of substantially 80°. However, it may also be square, rectangular, triangular or hexagonal. When it is hexagonal, it may also be in the form of a so-called trigonal insert.

Figure 2:
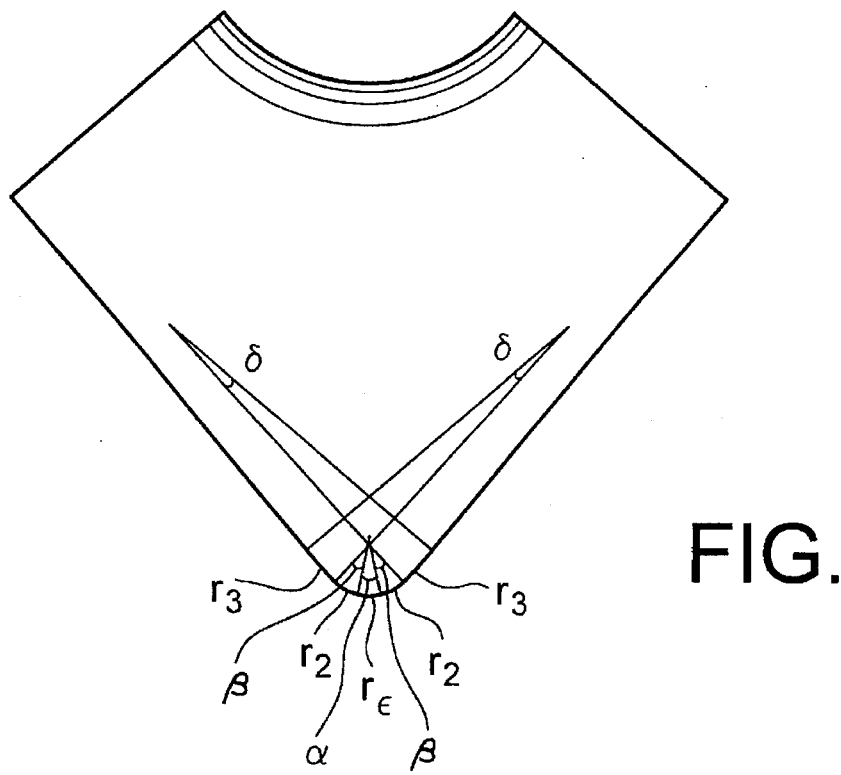
FIG. 2 shows a corner portion of a turning cutting insert according to the invention straight from above, with the different corner radii illustrated.
Figure 3:
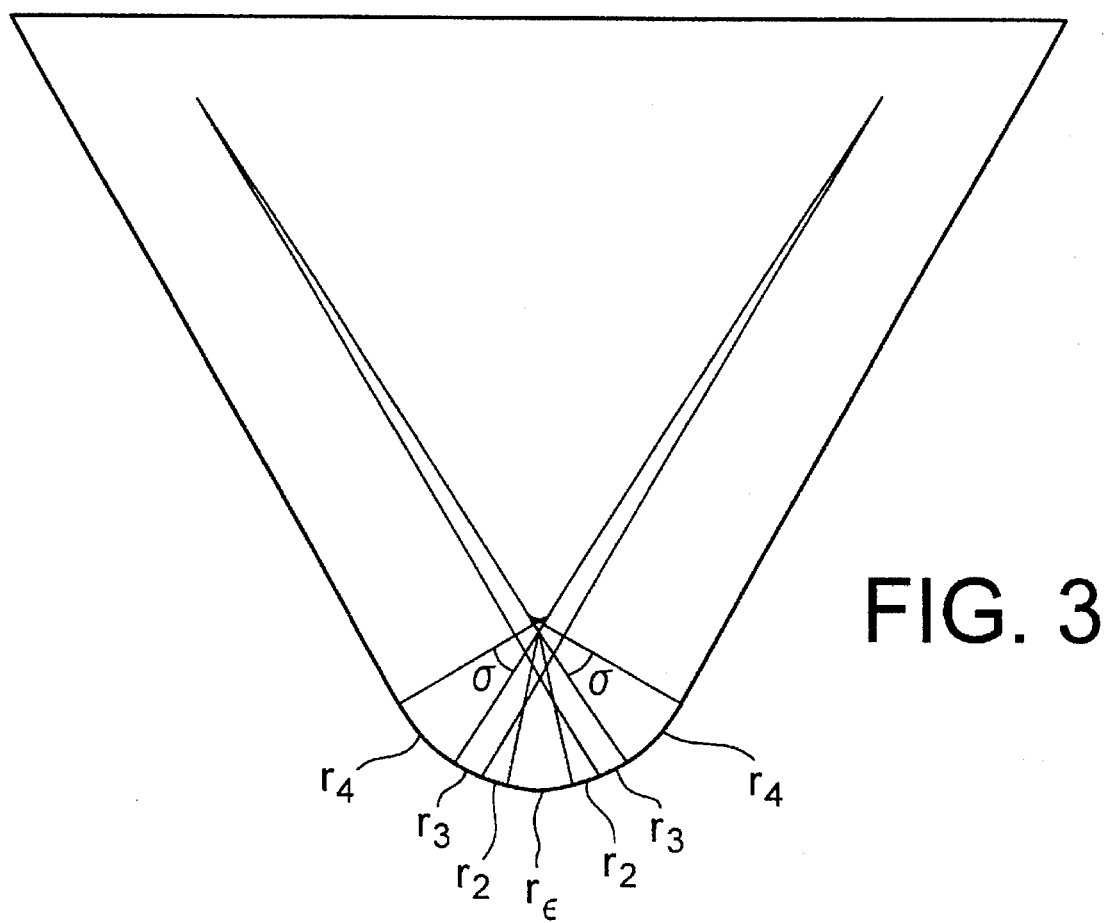
FIG. 3 shows a corner portion of another turning cutting insert according to the invention, straight from above, with the different radii illustrated.
Figure 4:
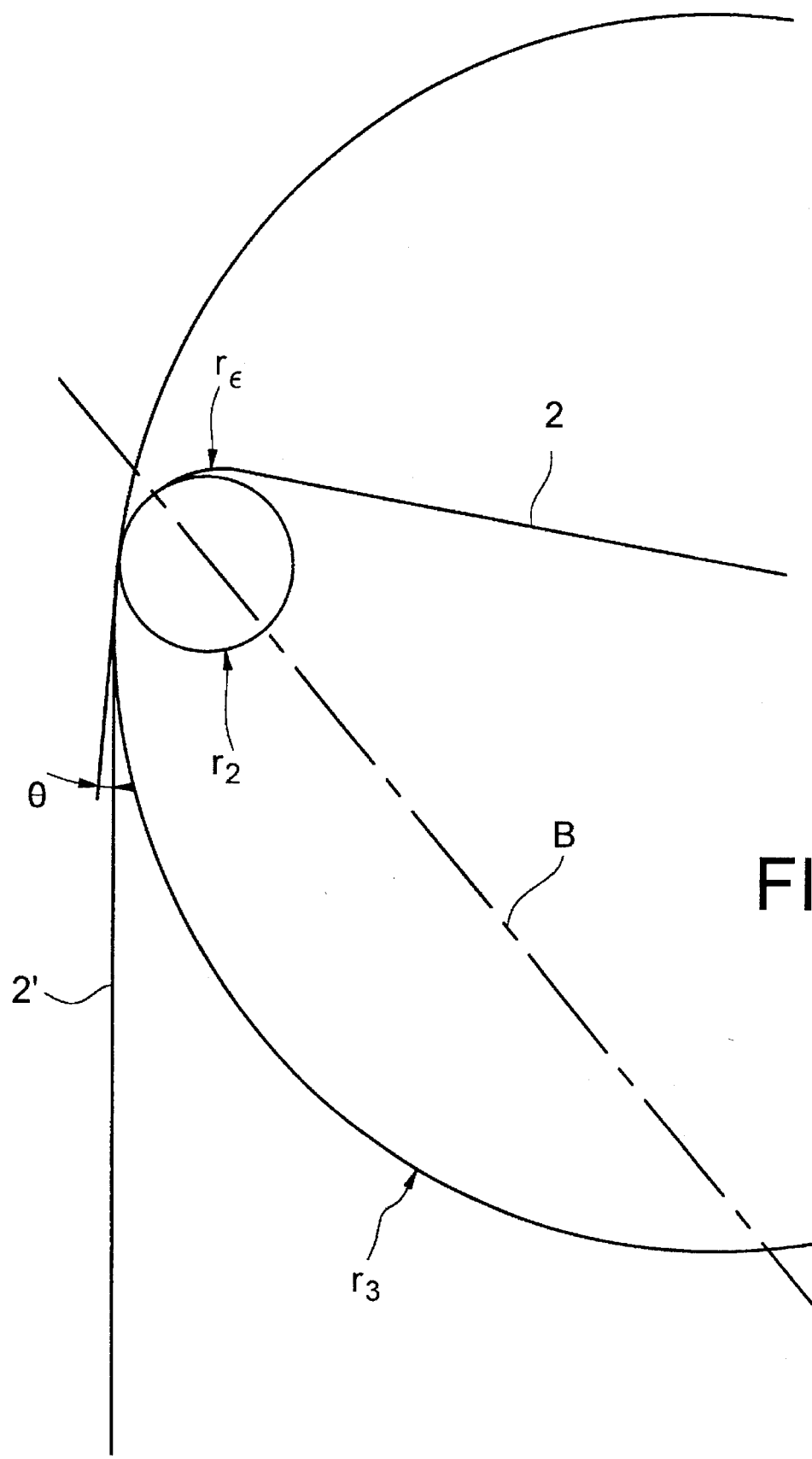
FIG. 4 shows schematically the different radii which may be comprised in a corner portion according to the present invention.

The essential feature of the present invention is that the corner radius is differentiated (i.e., non-constant), as illustrated in FIGS. 2, 3 and 4. According to a number of tests, this differentiation of the corner radius has brought about a surprisingly better surface smoothness of the machined surface in comparison with the same insert with a constant radius, and has also made the insert considerably less sensitive to the positioning of the entering angle. The differentiation may be: asymmetric in relation to the corner bisector; however, it is preferred that the corner nose radius surface be symmetrical with respect to the corner bisector. This results in the essential advantage that the cutting insert becomes symmetrical when being turned on, thereby enabling both left-hand and right-hand turning with the same insert, i.e., both left-hand and right-hand holders may be used. Further, a symmetrical corner geometry makes possible a symmetrical turning axially as well as radially.

In order to illustrate the different corner radii, the imaginary circle sectors are reproduced in FIGS. 2 and 3. The cutting corner in FIG. 2 has an angle of substantially 80° and is divided into five separate circle or cylinder-surface segments 5A, 5B, 5C, 5A' and 5B'. The middle segment 5C has a radius $r_c$. The two segments 5B and 5B' have substantially the same radius, which is designated $r_2$. Also the segments 5A and 5A' have substantially the same radius, which is designated $r_3$. For all cutting inserts according to the invention, it is valid that $$r_3 > r_c > r_2$$

The smallest difference between two radii should be 0.1 mm, preferably 0.2 mm, and in particular 0.3 mm. As long as this minimum difference is maintained, the three radii may vary within rather wide ranges. Thus, $r_e$ may be between 0.2 and 5 mm, preferably between 0.4 and 3.2 mm and most preferably between 0.4 and 1.6 mm. Radius $r_2$ may be between 0.1 and 4 mm, preferably between 0.2 and 3.2 mm and most preferably between 0.4 and 1.5 mm. Radius $r_3$ may be between 1 and 10 mm, preferably between 2.4 and 10 mm and most preferably between 4 and 8 mm.

Depending upon the corner radius of the cutting insert, the center angles $\alpha$, $\beta$ and $\delta$ of the imaginary circle sectors may also vary within wide ranges. However, considering the desired turning-over symmetry of the insert, the center angles $\delta$ of segments 5A and 5A' should be substantially equally large. The same is of course true for center angles $\beta$. The center angle $\alpha$ should be between 1° and 145°, preferably between 5° and 90° and most preferably between 10° and 40°. Each of the angles $\delta$ should be between 1° and 45°, preferably between 10° and 40° and most preferably between 15° and 35°. Each of angles $\delta0$ should be between 1° and 90°, and most preferably between 1° and 15°, and most preferably between 2° and 10°.

According to a preferred embodiment of the present invention, and particularly at smaller corner angles (for instance less than 80°), also a fourth radius $r_4$, should be provided symmetrically on both sides of the bisector of the cutting corner. As may be seen in FIG. 3, this radius is then positioned between segment 5A and side surface 4, and between segment 5A' and side surface 4', respectively. Radius $r_4$, should be at least 1 mm smaller than radius $r_3$ and is suitably between 0.1 and 5.0 mm, preferably between 0.1 and 2.4 mm and most preferably between 0.2 and 1.0 mm. The corresponding center angle $\delta$ of the sector should be between 1° and 45°, preferably between 5° and 40° and most preferably between 15° and 35°.

The connections between the different circle segments should be tangential. This. for example, means that the tangent of radius $r_2$ at the transition point with radius $r_3$ coincides with the tangent of radius $r_3$ at the same point. This results in smooth radius transitions and increases the insensitivity to a correct adjustment of the entering angle.

FIG. 4 illustrates the different radii which together constitute a modified corner radius according to the present invention. The straight lines 2 and 2' designate two adjacent cutting edges. In the area around the intersectional point of the cutting edge and the bisector B, point of origin of the radius $r_e$ (i.e., the center of a circle formed by radius $r_e$) is located radially inside the circle of thereby forming two intersectional points or transitions between $r_2$ and $r_e$, one on each side of the bisector. Between such an intersectional point and cutting edge 2 (or 2'), there is a further intersectional point or transition, namely the one between radius $r_3$, and radius $r_2$. The tangent for the latter point forms a clearance angle $\theta$ with cutting edge 2 (or 2'). This clearance angle $\theta$ is suitably between 4° and 29° and preferably between 3° and 7° for rhombic inserts or so-called trigonal inserts.

For the sake of comparison, a turning insert according to the present invention was tested together with and compared to a usual turning insert with a constant nose radius. Both inserts had a nose angle of 80°. The insert according to the invention had the following data:

| | |
|---|---|
| $r_e$ = 0.79 mm | $\alpha$ = 24° |
| $r_2$ = 0.65 mm | $\beta$ = 31° |
| $r_3$ = 4.7 mm | $\delta$ = 7° |

The conventional insert had a continuous radius $r_e$ of 0.79 mm. Both cutting inserts had a chip breaking geometry according to FIG. 1 and a clearance angle $\theta$ of 5°.

Figure 5:
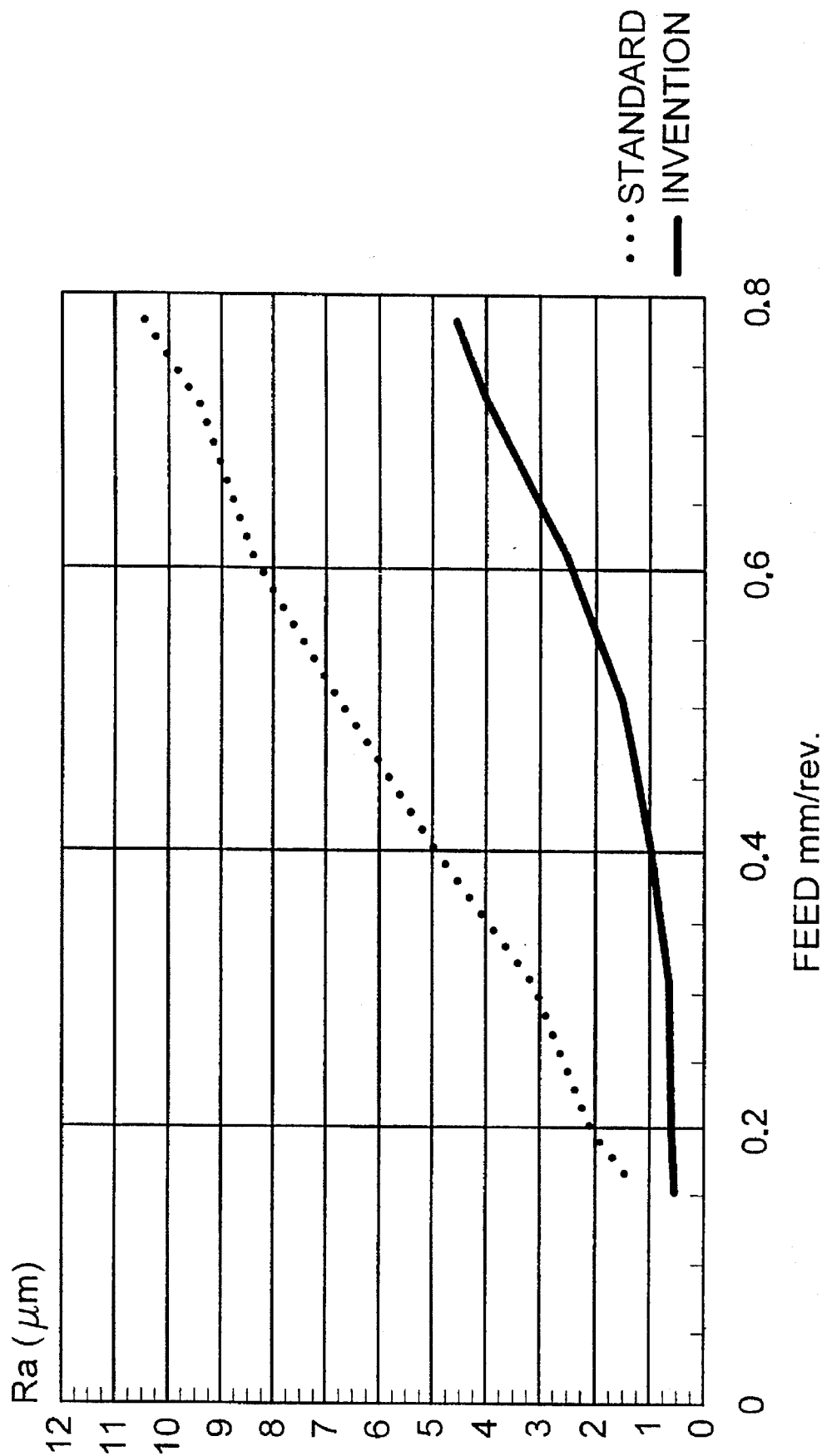
FIG. 5 shows a diagram relative to how the surface smoothness of the workpiece is improved thanks to the present invention, at different feeds.

The results during machining of low alloy wrought steel (SS 2511) are shown in the diagram in FIG. 5. On the Y-axis is given the obtained surface smoothness value $R_\alpha$ (i.e., the lower the value $R_\alpha$ the smoother the surface), in units of μm, and on the X-axis is given the feed in mm/revolution. The cutting speed was 180 m/min and the cutting depth was 2 mm. From this diagram it may for instance be seen that the $R_\alpha$-value at a feed of 0.8 mm/rev was substantially halved. From this, the superiority of cutting inserts with a nose radius sequence according to the present invention, is clearly shown in comparison with otherwise equal inserts having a constant nose radius. Moreover, contrary to the known cutting insert, an alteration of the entering angle from 91° to 93° had no prejudicial influence on the surface smoothness attained by turning with the insert according to the invention.

According to the above preferred embodiments, double-sided cutting inserts have been described and, therefore, the side surfaces 4 and 4' are perpendicular to the upper and lower surfaces. However, it is evident that if the insert is single-sided, the flank or side surfaces 4, 4', and the nose surfaces 5A–5C, preferably form an acute angle with the upper surface, the preferred insert-inherent angle of clearance being between 5° and 11°.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert for turning comprising an upper surface, a bottom surface substantially parallel with said upper surface, and at least three side surfaces extending between said upper and bottom surfaces, a transition between two adjacent side surfaces forming a rounded nose radius surface, and an intersection of said upper surface and said nose radius surface forming a nose cutting edge, said nose cutting edge comprises at least five circle segments arranged in succession between adjacent side surfaces and together forming a smoothly curved nose cutting edge, with successive circle segments having different radii of curvature, wherein said at least five circle segments comprise a first segment intersected by an imaginary bisector of said nose radius corner and having a first radius of curvature, second and third segments located at respective sides of said first segment and having equal second and third radii of curvature, respectively, and fourth and fifth segments located at sides of respective ones of said second and third segments and having equal fourth and fifth radii of curvature, respectively, wherein each of said equal fourth and fifth radii of curvature is larger than said first radius of curvature, and said first radius of curvature is larger than each of said equal second and third radii of curvature.

2. The cutting insert according to claim 1, wherein said at least five circle segments are situated at least at a portion of said nose radius surface located adjacent said nose cutting edge.

3. The cutting insert according to claim 2, wherein said at least five circle segments occupy an entire height of said nose radius surface extending from said upper surface to said lower surface.

4. The cutting insert according to claim 1, wherein said at least five circle segments occupy an entire height of said nose radius surface extending from said upper surface to said lower surface.

5. The cutting insert according to claim 1, wherein said at least five circle segments comprise seven circle segments.

6. The cutting insert according to claim 1, wherein a smallest difference between any two radii of said at least five circle segments is 0.2 mm.

7. The cutting insert according to claim 1, wherein said first radius is between 0.4 and 1.6 mm, each of said equal second and third radii is between 0.4 and 1.5 m, and said equal fourth and fifth radii are between 4 and 8 mm.

8. The cutting insert according to claim 1, wherein said first segment defines a first angle between 5 and 90 degrees, said second and third segments defining equal second and third angles, respectively, between 10 and 40 degrees, and said fourth and fifth segments defining equal fourth and fifth angles, respectively, between 1 and 15 degrees.

9. The cutting insert according to claim 1, wherein said first segment defines a first angle between 5 and 90 degrees, said second and third segments each defining equal second and third angles, respectively, between 10 and 40 degrees, and said fourth and fifth segments defining equal fourth and fifth angles each being between 1 and 15 degrees.

10. The cutting insert according to claim 9 further including equal sixth and seventh circle segments, said sixth segment located between said fourth segment and a respective side surface, said seventh circle segment located between said fifth segment and a respective side surface.

11. The cutting insert according to claim 10, wherein said sixth and seventh segments define equal sixth and seventh radii of curvature respectively, each being between 0.2 and 1.0 mm.

12. The cutting insert according to claim 11, wherein each of said sixth and seventh segments defines an angle between 15 and 35 degrees.

* * * * *